(12) United States Patent
Browning et al.

(10) Patent No.: US 8,886,687 B2
(45) Date of Patent: Nov. 11, 2014

(54) ONLINE SAFETY DEPOSIT BOX

(75) Inventors: John Browning, Fallston, MD (US);
Michael Robinson, Churchville, MD (US); Pradip Sitaram, Ellicott City, MD (US)

(73) Assignee: EZShield, Inc., Baltimore, MD (US)

( * ) Notice: Subject to any disclaimer, the term of this patent is extended or adjusted under 35 U.S.C. 154(b) by 353 days.

(21) Appl. No.: 13/057,158

(22) PCT Filed: Aug. 6, 2009
(Under 37 CFR 1.47)

(86) PCT No.: PCT/US2009/052909
§ 371 (c)(1),
(2), (4) Date: Oct. 3, 2011

(87) PCT Pub. No.: WO2010/017335
PCT Pub. Date: Feb. 11, 2010

(65) Prior Publication Data
US 2012/0131064 A1 May 24, 2012

Related U.S. Application Data

(60) Provisional application No. 61/086,605, filed on Aug. 6, 2008.

(51) Int. Cl.
*G06F 7/00* (2006.01)
*G06F 17/30* (2006.01)
(52) U.S. Cl.
CPC ............................... *G06F 17/30011* (2013.01)
USPC ........................................... 707/805; 707/804
(58) Field of Classification Search
None
See application file for complete search history.

(56) References Cited

U.S. PATENT DOCUMENTS

| 6,253,322 | B1 * | 6/2001 | Susaki et al. ................... 713/170 |
| 7,966,647 | B1 * | 6/2011 | Igoe et al. ............................ 726/2 |
| 2002/0046188 | A1 * | 4/2002 | Burges et al. .................... 705/67 |
| 2002/0152173 | A1 * | 10/2002 | Rudd ............................... 705/57 |
| 2003/0097331 | A1 * | 5/2003 | Cohen ............................... 705/39 |
| 2006/0026213 | A1 * | 2/2006 | Yaskin et al. .................. 707/200 |
| 2006/0184540 | A1 * | 8/2006 | Kung et al. ..................... 707/10 |
| 2006/0265688 | A1 * | 11/2006 | Carlson et al. ................ 717/101 |
| 2007/0150475 | A1 * | 6/2007 | Hamada ............................ 707/9 |
| 2007/0187266 | A1 | 8/2007 | Porter et al. |
| 2007/0220614 | A1 * | 9/2007 | Ellis et al. ........................ 726/27 |
| 2007/0262861 | A1 | 11/2007 | Anderson et al. |
| 2008/0109370 | A1 * | 5/2008 | Moshir et al. ................... 705/64 |
| 2008/0163342 | A1 * | 7/2008 | Christopherson ................ 726/4 |

OTHER PUBLICATIONS

International Serach Report Issued Oct. 30, 2009 in PCT/US09/52909 filed Aug. 6, 2009.

* cited by examiner

*Primary Examiner* — Tony Mahmoudi
*Assistant Examiner* — Tuan A Pham
(74) *Attorney, Agent, or Firm* — Nixon Peabody LLP

(57) ABSTRACT

A method includes creating an electronic record of an asset, and automatically associating a predefined data structure with an electronic record of the asset that controls organization and display of user provided metadata describing the asset. The method may also include receiving the metadata describing the asset from a remote computer, populating the predefined data structure with the metadata describing the asset, and generating a graphical user interface corresponding to the electronic record of the asset with active tabs that provide a visual representation of the predefined data structure associated to the electronic record of the asset. The active tabs are respectively associated with predefined displays including the data fields provided by the predefined data structure, enabling a user to navigate through different displays corresponding to the data fields provided in the predefined data structure associated with the asset to view the metadata describing the asset.

12 Claims, 21 Drawing Sheets

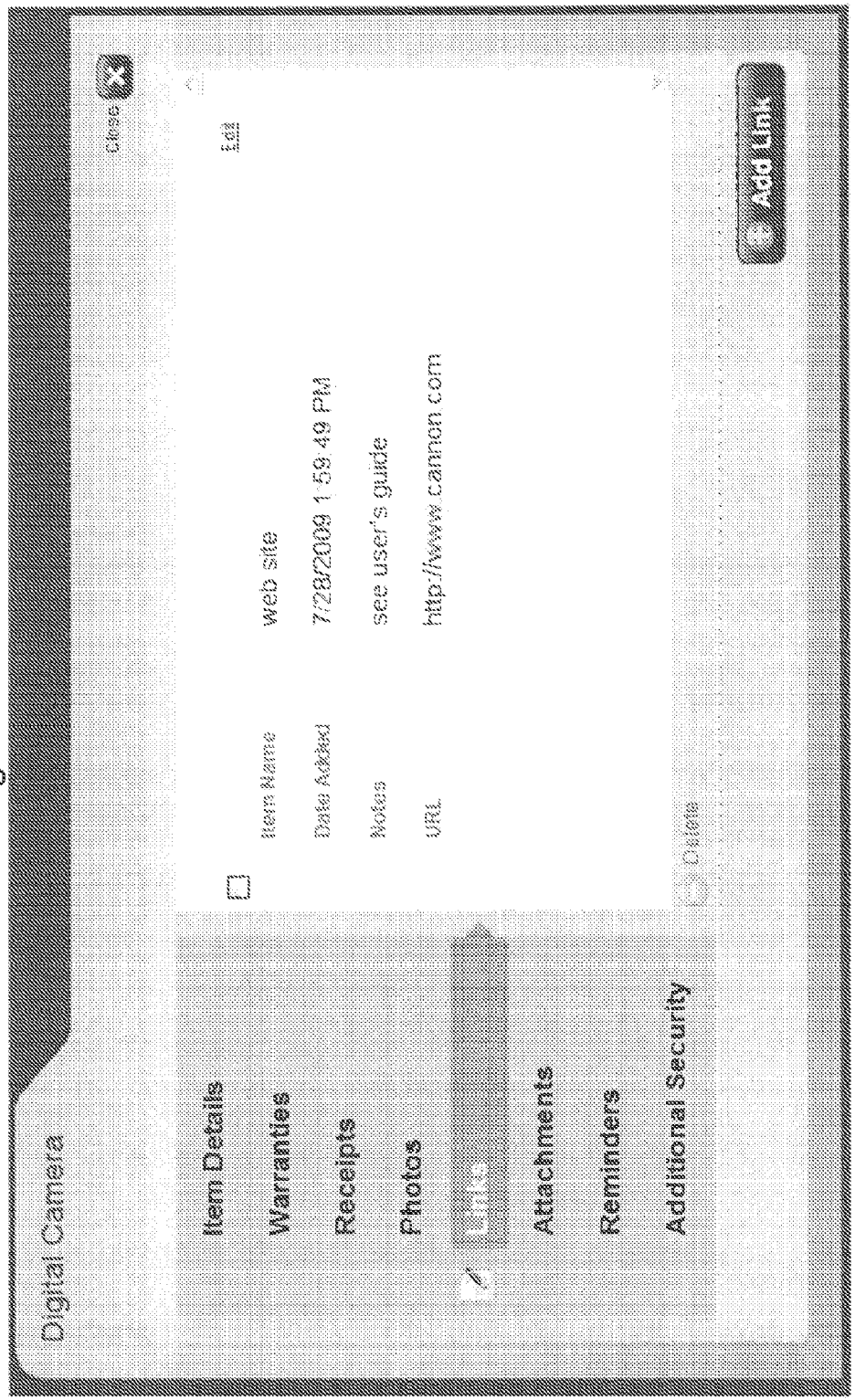

My Reminders

My Property Reminders

| Item Name | Item Type | Event Date | Reminder Date | Notes |
|---|---|---|---|---|
| plasma TV | Electronics | Jul 01, 2010 | Dec 01, 2009 | Warranty expiration (warranty on plasma TV exp. |
| Digital Camera | Electronics | Jul 26, 2010 | Jul 01, 2010 | Warranty Expiration (Check camera for problem... |

My Life Reminders

| Item Name | Item Type | Event Date | Reminder Date | Notes |
|---|---|---|---|---|
| Jungle's Gym | Membership | Aug 01, 2009 | Jul 31, 2009 | Fitness Assessment (appointment at 10am) |

My Finances Reminders
No Reminders

My General Reminders
No Reminders

Add Reminder >>

Fig. 12

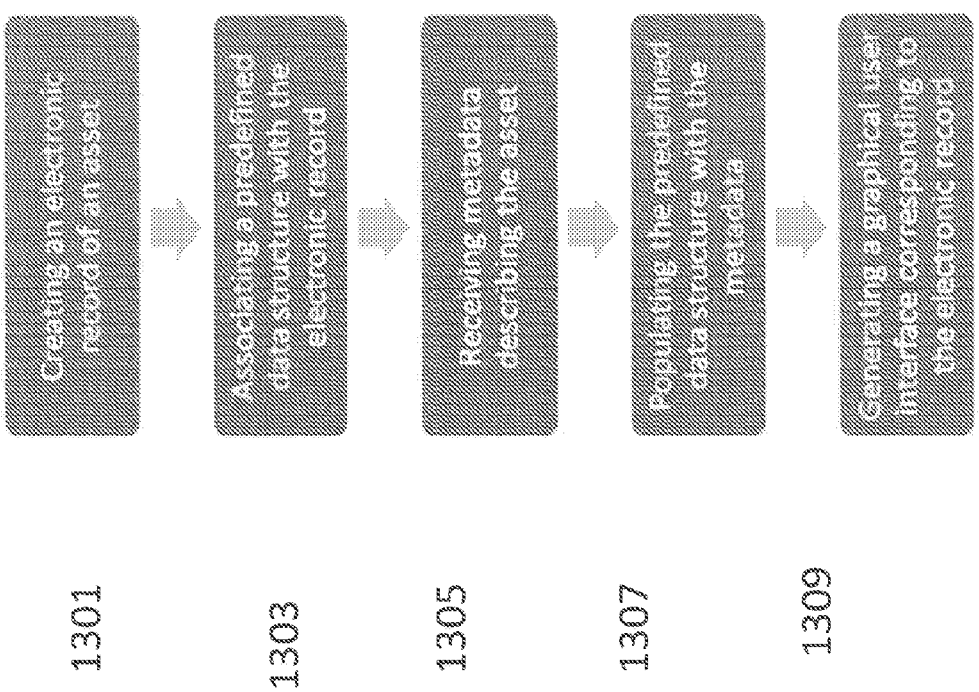

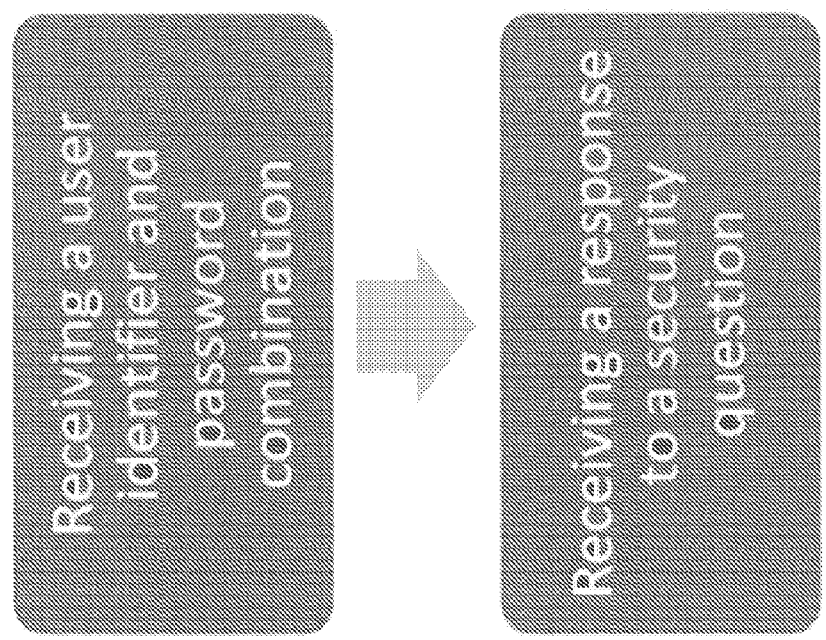

ONLINE SAFETY DEPOSIT BOX

CROSS-REFERENCE TO RELATED APPLICATIONS

The present application claims the benefit under 35 U.S.C. §119(e) to provisional application 61/086,605, filed in the U.S. Patent and Trademark Office on Aug. 6, 2008, the entire contents of which are hereby incorporated by reference.

BACKGROUND

1. Technological Field

The present application relates to a system, method, and computer readable storage medium for data backup, storage, and retrieval. Particularly, enhanced features are provided by using metadata to create a catalog of the stored data.

2. Description of the Related Art

People conventionally store documents in paper form. For example, manuals for appliances, warranty cards, birth certificates, legal documents, medical records, financial documents, etc. are stored in countless file cabinets in homes across the United States. However, such paper file systems quickly become messy as their volume increases. Furthermore, these paper documents are lost for good if destroyed.

With the advent of scanning devices, the above-noted paper documents may be converted into an electronic file and stored on a hard disc drive (HDD), a floppy disc (or other magnetic storage device), a flash memory drive, or an optical disc (CD or DVD). Alternatively, online storage space has become available. There are several websites where people can upload their electronic photographs or other electronic files for remote storage.

HDD and online file storage sites may merely store all the documents in a memory device without any organization, or they may offer a conventional file management system/interface, such as WINDOWS EXPLORER that provides a user with a conventional tree structure including a hierarchy of folders, sub-folders, and data files.

In these conventional file management systems/interfaces, a user navigates through the folders, sub-folders and files. However, the only information the user has regarding the folders, sub-folders, and data files through this navigation process is their respective file names. In these conventional systems, the only way to know the content of the underlying file is to open the file. For example, if a PDF document of a will is stored on a conventional HDD or server that provides a conventional file management system/interface, a user may have to navigate through multiple levels of folders and sub-folders to reach the PDF document. Along the way, the user would only be provided with vague descriptions such as "My Documents," "legal documents," and "Will." The file name of the PDF document itself ("Will") only provides a generic description and does not provide the user with information of the content of the PDF file. For example, the files names do not provide any information regarding the terms of the will. In such conventional systems, a user must open the PDF document to view the contents of the file.

SUMMARY

The embodiments described herein provide a new data structure for organizing information. Rather than navigating through files, a new data structure is provided that allows users to navigate through metadata, which allows the user to review the content of the file without having to open the file itself.

In an exemplary embodiment, there is a method of storing data in a memory device of a computer system, that includes: creating, at the computer system, an electronic record of an asset that is stored in the memory device; automatically associating, at the computer system, a predefined data structure with the electronic record of the asset that controls organization and display of metadata describing the asset, the predefined data structure providing data fields for the metadata that are associated with the electronic record of the asset; receiving, at the computer system, the metadata describing the asset from a remote computer; populating, at the computer system, the predefined data structure with the metadata describing the asset; and generating, at the computer system, a first graphical user interface corresponding to the electronic record of the asset with a plurality of active tabs that provide a visual representation of the predefined data structure associated to the electronic record of the asset, the active tabs, respectively associated with predefined displays including the data fields provided by the predefined data structure, enabling a user to navigate through different displays corresponding to the data fields provided in the predefined data structure associated with the asset to view the metadata describing the asset.

In another embodiment, the method further includes: assigning a respective category to each of a plurality of assets; automatically grouping the plurality of assets by their respective category; and generating a second graphical user interface that displays the assets grouped by their respective categories.

In another embodiment, the method further includes: performing a log-in process for the computer system that includes receiving a user identifier and password combination, and a response to a security question; and storing data at the computer system in an encrypted form.

In another embodiment, the method further includes: receiving first information identifying another entity that has permission to access the computer system under an account of the user; and receiving second information limiting the another entity to access only a sub-set of assets stored in the computer system.

In another embodiment, the method further includes: receiving an image file; associating the image file with the electronic record of the asset; generating a thumbnail image by the computer system; and displaying the thumbnail image along with the metadata In another embodiment, the receiving includes receiving the image file via an email, and the method further includes storing the image file received via the email in a holding area until an instruction is received regarding how the image file is associated with the predefined data structure.

Another embodiment includes a computer readable storage medium encoded with instructions, which when executed by a computer system causes the computer system to implement the methods described herein.

Another embodiment includes an apparatus that includes a processor programmed to implement the methods described herein.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is an exemplary network upon which embodiments discussed herein may be implemented on;

FIG. 2 is an example of a computer upon which embodiments discussed herein may be implemented on;

FIG. 8B is another exemplary embodiment of a GUI used to navigate through an online safety deposit box;

FIG. 12 is another exemplary embodiment of a GUI used to navigate through an online safety deposit box;

FIG. 13 is an exemplary embodiment of a method of creating and managing an electronic record of an asset in an online safety deposit box;

FIG. 14 is an exemplary embodiment of a method of logging onto an online safety deposit box;

DETAILED DESCRIPTION

Figure 1:
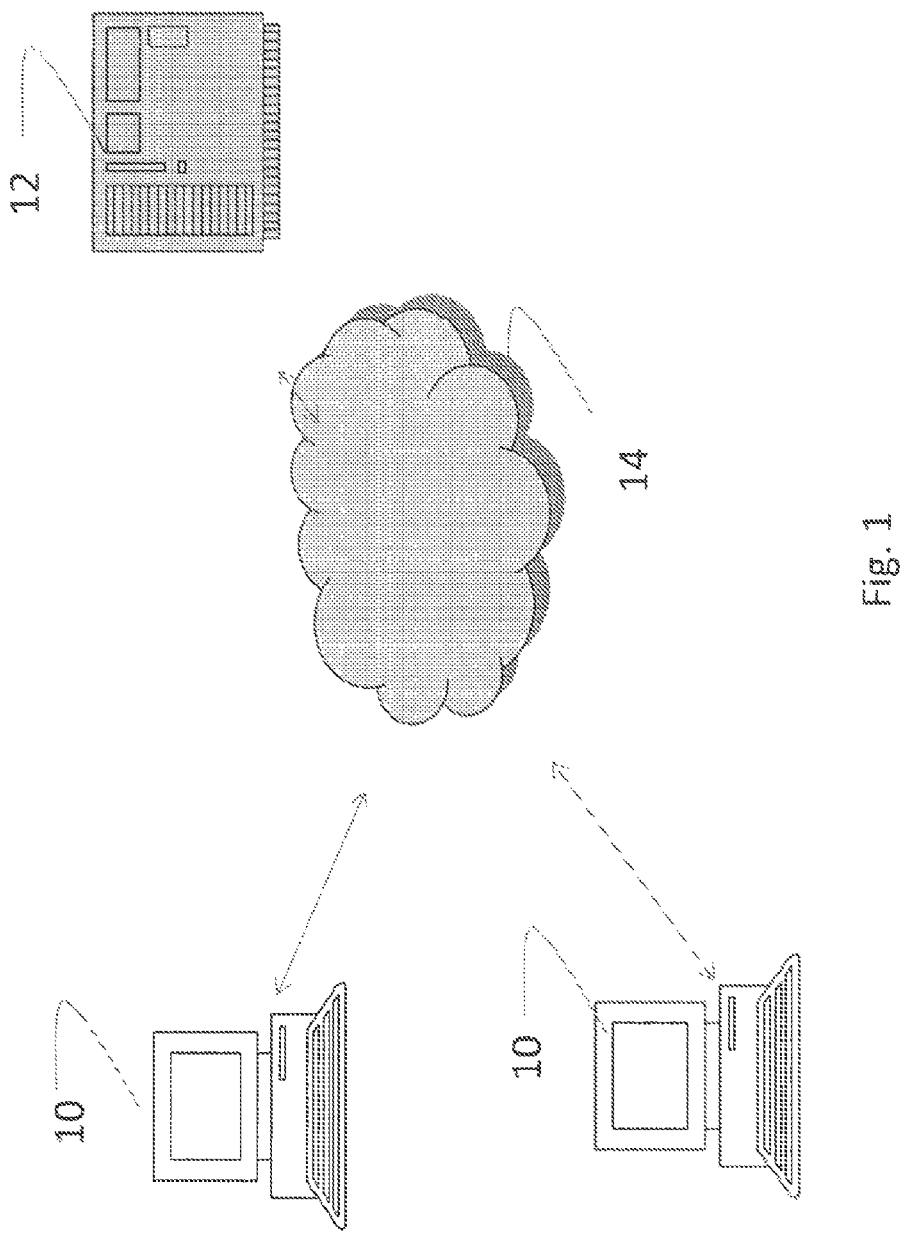

In general, the embodiments described herein provide a new data structure for organizing information. Rather than navigating through files, a new data structure is provided that allows users to navigate through metadata, which allows the user to review the content of the file without having to open the file itself. Generally, metadata is data about other data. An item of metadata may describe an individual datum, or content item, or collection of data including multiple content items and hierarchical levels, for example a database schema (a structure described in a formal language supported by a set of computer programs that control the creation, maintenance, and use of logically related records).

A data structure is a particular way of storing and organizing data in a computer so that it can be used efficiently. Data structures may be based on the ability of a computer to fetch and store data at any place in its memory, specified by an address—a bit string that can be itself stored in memory and manipulated by a program. Record and array data structures are based on computing the address of data items with arithmetic operations; while linked data structures are based on storing addresses of data items within the structure itself. Many data structures use both principles.

Implementation of a data structure may use a set of written computer executable instructions that create and manipulate instances of that structure. Any computer language may be used to implement the embodiments that follow, including, but not limited to: C programming languages (and other object oriented programming languages), Java, and Pascal.

Referring now to the drawings, wherein like reference numerals designate identical or corresponding parts throughout the several views.

FIG. 1 shows an exemplary embodiment of an online safety deposit box. One or more user computers 10 are connected to a system computer 12 over the Internet 14. The user computer 10 can be any type of computer, including mobile (PDA or mobile phone), home and office computers (PC or MAC). The term "computer" is used herein to include any device having a processor capable of executing program instructions, including but not limited to personal computers, notebook computers, hand held personal digital assistants ("PDA") and mobile phones. As used herein the term "user computer" refers to any computer from which a user can access the Internet 14 and system computer 12.

Figure 2:
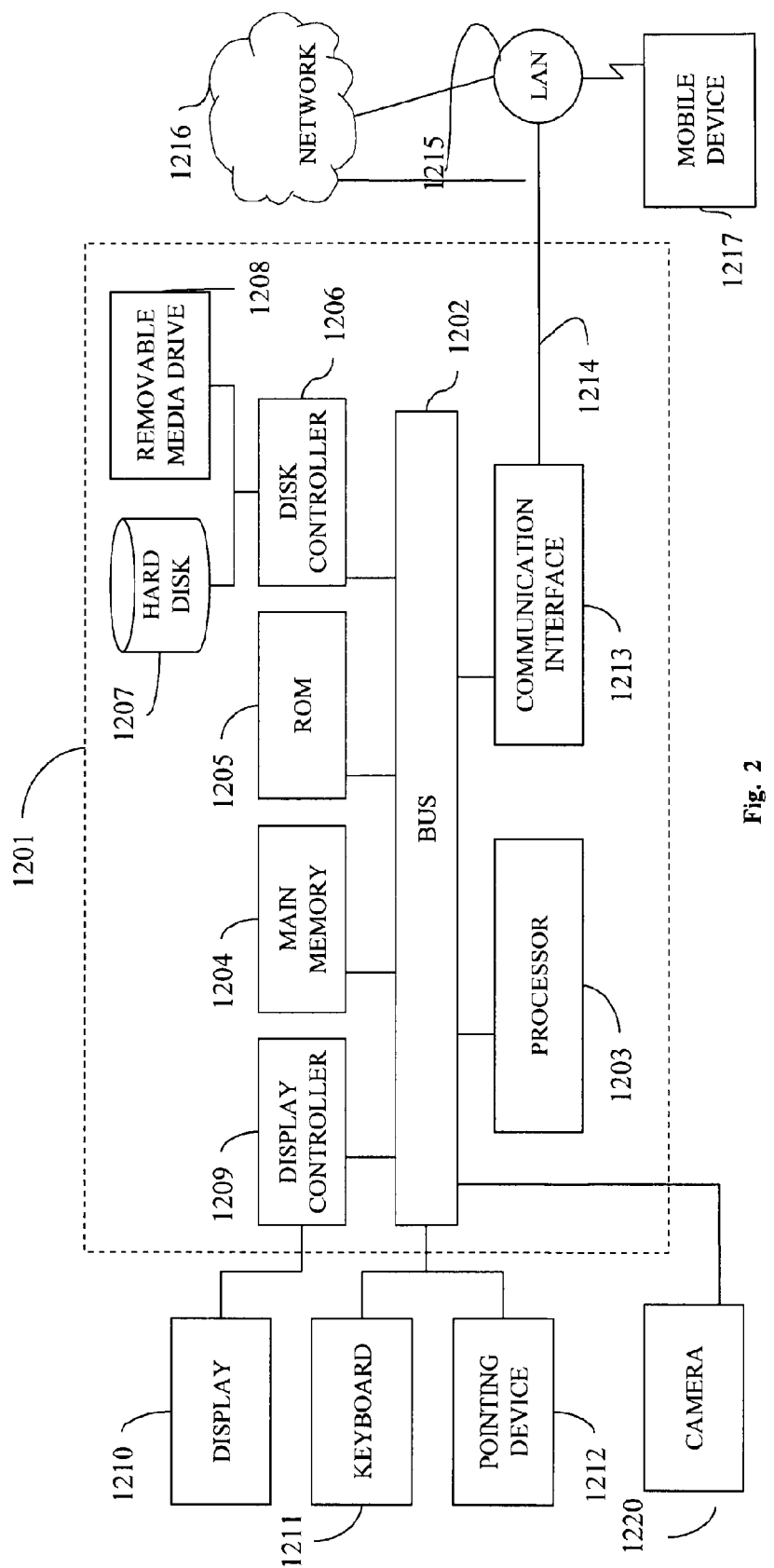

FIG. 2 illustrates an exemplary embodiment of system computer 12 upon which an exemplary embodiment of the online safety deposit box may be implemented. The system computer 12 includes a bus 1202 or other communication mechanism for communicating information, and a processor 1203 coupled with the bus 1202 for processing the information. The system computer 12 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The system computer 12 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The system computer 12 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the system computer 12 using an appropriate device interface (e.g., small computer system interface (SCSI), integrated device electronics (IDE), enhanced-IDE (E-IDE), direct memory access (DMA), or ultra-DMA).

The system computer 12 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The system computer 12 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the system computer 12.

The system computer 12 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the system computer 12 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the system computer 12, for driving a device or devices for implementing the invention, and for enabling the system computer 12 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable storage medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable storage media may be involved in carrying out one or more sequences of one or more instructions to processor 1203 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the system computer 12 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The system computer 12 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the system computer 12, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predefined frequency band, different than baseband, by modulating a carrier wave. The system computer 12 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

In a first embodiment, an online safety deposit box is provided at a server remote from a user's computer. Using a web browser on the user's computer, the user can access a web page that provides a portal to the online safety deposit box.

Initially, a graphical user interface (GUI) may be provided to the user which requests that the user log in to the system. Any level of security may be provided. Preferably, the password includes at least eight characters with a mix of upper and lower case letters, numbers, and other symbols (i.e., @, $, %, etc.). An alternative embodiment of the system may also require a second level of user authentication. In addition to entering a user name/password combination, the GUI may require the entry of a pin number or the answer to a security question (i.e., provide mother's maiden name, name of first pet, etc.).

Once logged into the system, a user can create electronic records for assets that may be stored in the online safety deposit box. An asset may be anything the user would like to have stored in the online safety deposit box. Exemplary assets are discussed herein, but are not intended to be an exhaustive list. Assets may fall into one or more of the categories of property, finances, or documents pertaining to ones own life (i.e., wills, passports, birth certificates, medical records, etc.).

Figure 3:
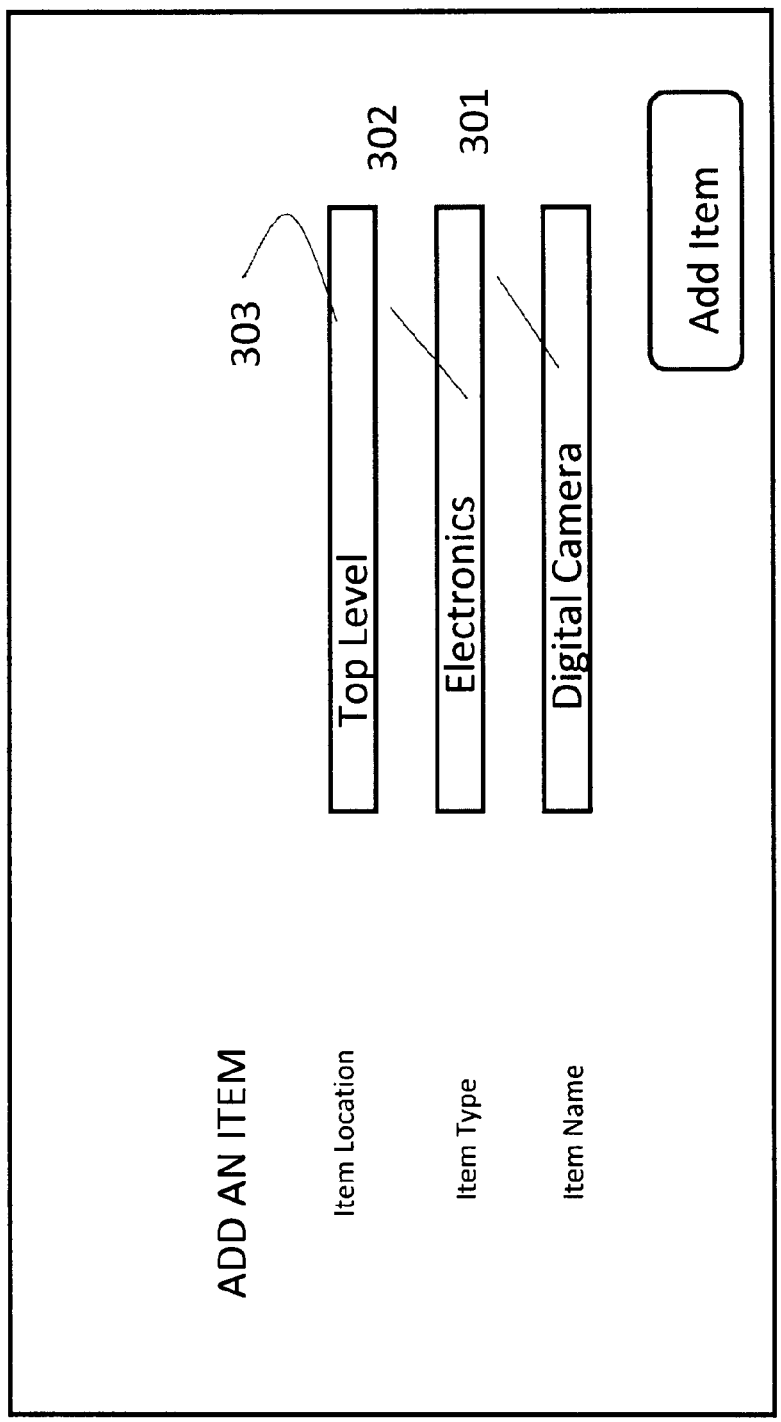
FIG. 3 is an exemplary embodiment of a graphical user interface (GUI) that is to create an electronic record of an asset.

FIG. 3 shows an exemplary graphical user interface used to create an electronic record for an asset. In this non-limiting example, the asset is a user's digital camera, which is entered by the user into the Item Name field 301. When creating an electronic record of an asset, the user selects the Item Type from drop down menu 302, which may include the following options: electronics, appliance, furniture, garden, vehicle, maintenance, home owners insurance, auto insurance, carpet, misc, house, jewelry, rental property, collectable, and antique. This is not an exhaustive list, but merely provides examples. In alternative embodiments, the user can create additional categories to fit their individual needs.

The Item Location field 303 indicates where the asset fits into a predefined data structure that is associated to the electronic record of the asset. The predefined data structure includes different levels, one being a top level, and subsequently created sub-levels. An initial asset added into the system may be at the top level of a hierarchy of the data structure. Subsequent assets may also be added to the top level, or may be added as a sub-level of an earlier created asset. For example, after the electronic record for the digital camera is created, a subsequent electronic record of an asset may be created that has an item location beneath the digital camera. A memory card for the digital camera, for example, may be an asset that has an Item Location that is in a sublevel of the digital camera (see FIG. 11 discussed below).

After an electronic record of the asset is created, a predefined data structure is added to the electronic record of the asset. The predefined data structure controls the organization and display of user provided metadata that describes the asset. The predefined data structure provides a hierarchy of tabs that generally define a categorical description for the asset, and provides data fields into which the user provided metadata is provided. A data field is a place where data can be stored. The field may contain data to be entered as well as data to be displayed. An electronic record is a collection of related fields. A file is a collection of related records.

For example, the hierarchy of tabs may include labels of "Item Details," "Warranties" and "Receipts" regarding the asset. In the example of the digital camera asset, an "Items Details" tab, when selected/activated, causes metadata describing the asset to be displayed in a graphical user interface (GUI). Such a graphical user interface includes data fields corresponding to the predefined data structure. The graphical user interface allows a user to enter information (metadata) about the digital camera (asset) into the predefined data fields of the predefined data structure, to save the metadata, and subsequently view the metadata.

Figure 4:
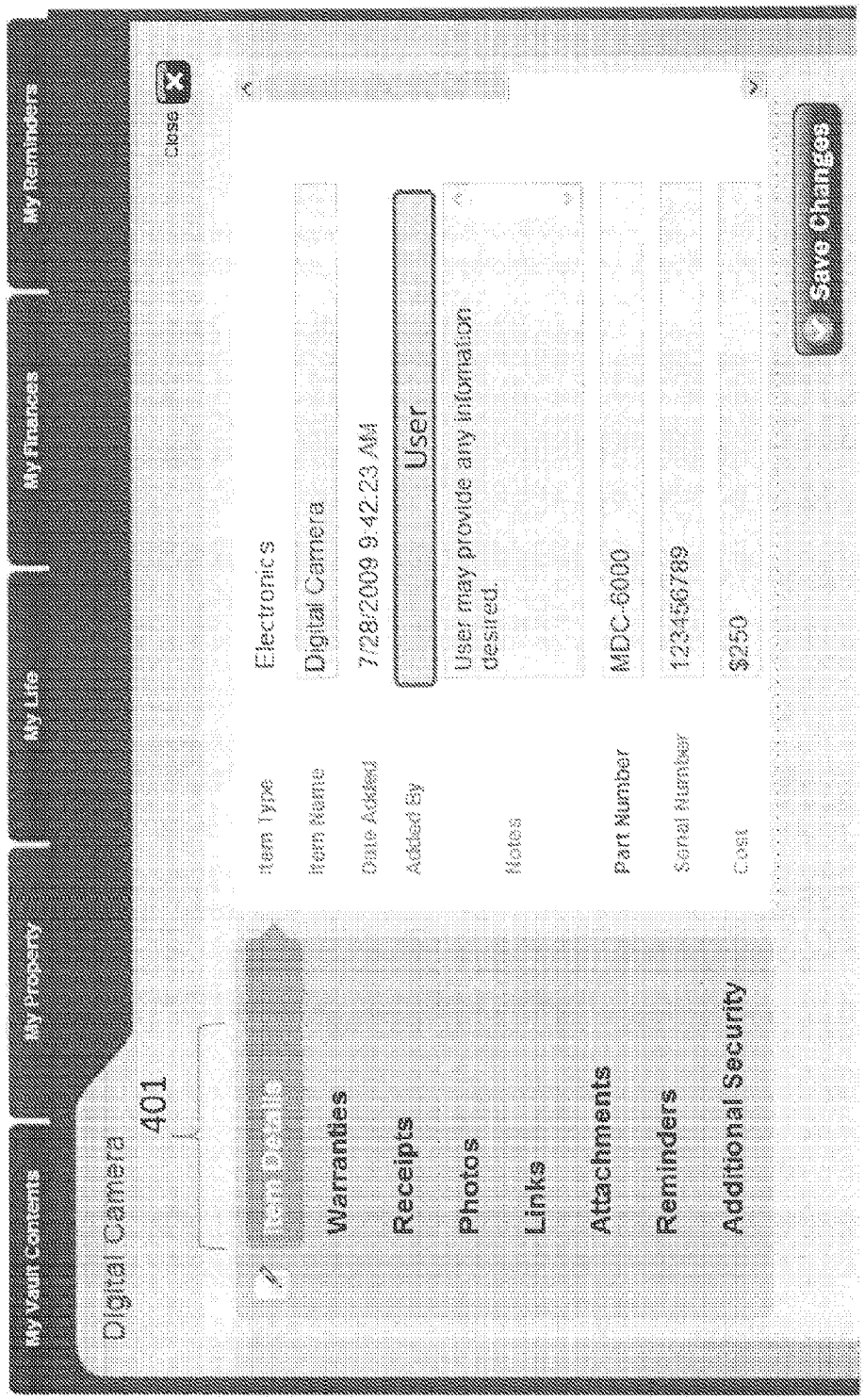
FIG. 4 is an exemplary embodiment of a GUI used to navigate through an online safety deposit box.

FIG. 4 shows an example of the GUI provided to the user referred to above. The GUI of FIG. 4 includes an array of predefined tabs that, when activated/selected, allows the user to added descriptive material (i.e., metadata) to the asset created with respect to the discussion of FIG. 3. In FIG. 4, the "Item Details" tab is selected. A "tab" is an electronic button or link that is used to navigate through the GUI's and data structure.

FIG. 4 shows the following tabs 401: "Item Details," "Warranties," "Receipts," "Photos," "Links," "Attachments," "Reminders," and "Additional Security." In alternative embodiments, the user can add customized tabs. Each of the tabs corresponds to a different part of the predefined data structure, and displays corresponding data fields of the predefined data structure.

The GUI of FIG. 4 is generated by the system computer of the online safety deposit box so a user may navigate through the predefined data structure. The interface corresponds to the predefined data structure so the user is provided with an intuitive way to navigate through the information provided in the online safety deposit box. The tabs allow the user to navigate to the data fields of the data structure, view metadata added to the data fields by the user so that the user may determine what files are stored in the online safety deposit box without opening/downloading any files.

FIG. 4 shows exemplary data fields that are displayed when the "Item Details" tab is activated. In this example, the fields are populated with user provided metadata describing the digital camera asset. Exemplary data fields include: item type (from FIG. 3); item name (from FIG. 3); date added; identifier of who added the asset; notes that may include any information a user desires to provide about the asset; part number; serial number; cost, brand, dealer, dealer phone (or other contact information); sales person; purchase date; and deliver/pickup data. These items are not an exhaustive list, and are only provide as examples. In alternative embodiments, a user may add customizable fields.

Figure 5A:
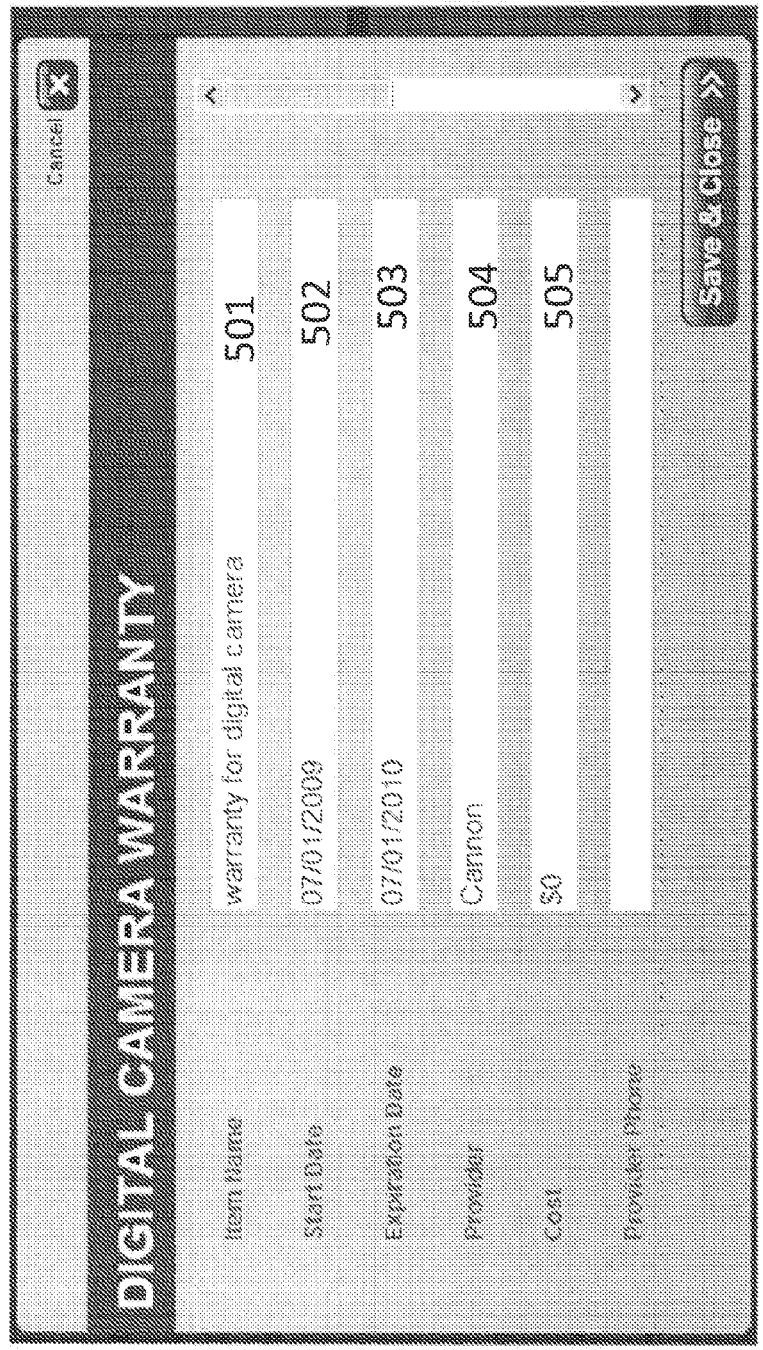
FIG. 5A is another exemplary embodiment of a GUI used to navigate through an online safety deposit box.
Figure 5B:
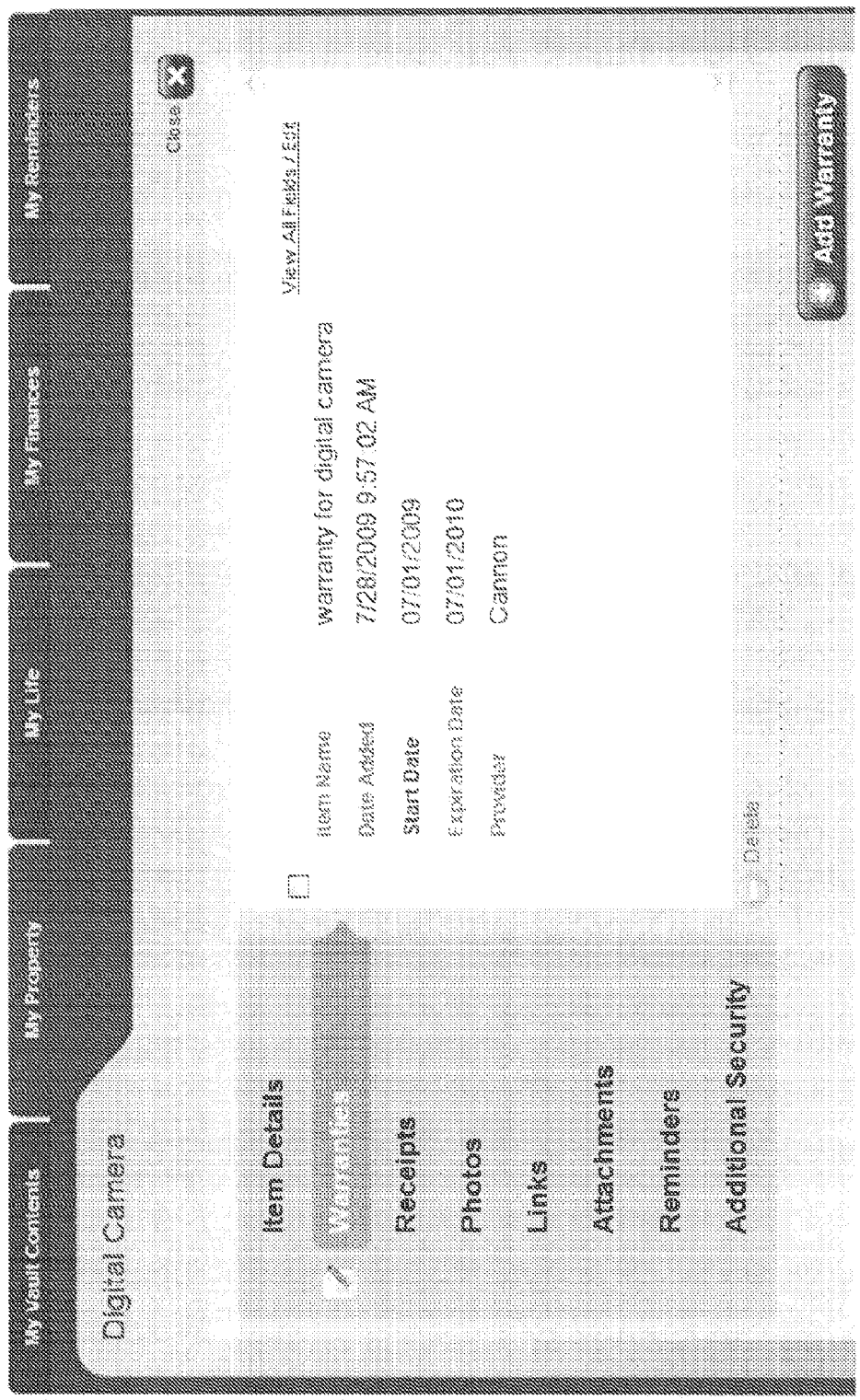
FIG. 5B is another exemplary embodiment of a GUI used to navigate through an online safety deposit box.

The "Warranty" tab provides the user with a GUI (FIG. 5A) that allows the user to enter data regarding the warranty for the digital camera asset. The GUI of FIG. 5A provides several predefined data fields in which the user provides information regarding the warranty for the digital camera. The user provides an item name for this information into the Item Name field 501 (in this example, "warranty for digital camera," a start date of the warranty into the Start Data field 502 (in this example Jul. 1, 2009), an end date for the warranty in the Expiration Data field 503 (in this example Jul. 1, 2010, a provider of the warranty in the Provider Data field 504 (in this example, camera manufacturer Cannon), and a cost of the warranty in the Cost Data field 505 (in this example $0, but dollar amounts may be applicable if an extended warranty is purchased). Other data field may also be provided for the receipt of information from the user, such as contact information regarding the insurer, the insurance agent, plan/policy numbers, etc. After the warranty information is entered into the data fields of the GUI in FIG. 5A, the warranty tab, when selected from FIG. 4B, is displayed as a catalog card in FIG. 5B. FIG. 5B provides a catalog card of the metadata provided by the user regarding the digital camera.

In the embodiment described above in FIGS. 4, 5A, and 5B, the category of warranty is part of the predefined data structure, and user input metadata (data describing other data, here the warranty information describing the asset Digital Camera) is automatically displayed when the warranty tab is selected. This system uses the user input metadata to create a catalog that allows the user to be provided with a description of what is stored in the online safety deposit box without having to open underlying files uploaded to the server. In this example, the User viewing FIG. 5B does not have to open a PDF file containing the underlying warranty policy to obtain warranty information. Rather, the user can use the predefined data structure, populated with the user supplied metadata, to view the information about the warranty. In this embodiment, the user navigates through metadata information regarding the asset, rather then searching through folders and opening/reading an underlying file. In other words, the predefined data structure associated to the electronic record of the asset present a user with metadata first so the user can determine what is stored in the online safety deposit box, which allows the user to then determine if an underlying file (i.e., a PDF document) needs to be retrieved and opened or read.

The "Receipt" tab from FIG. 4 provides the user with a GUI (shown in FIG. 6A) that allows the user to upload an image of the receipt. This allows the user to maintain a copy of the receipt for the user's digital camera in a secure location that can be easily found with other information regarding the digital camera. The GUI of FIG. 6A includes Item Name field 601, a Your File field 602 identifying the name of the file that was uploaded; an Update Your File field 603 that allows the user to upload a new file, and a Notes field 604 in which the user can provide descriptive comments regarding the receipt.

Figure 6A:
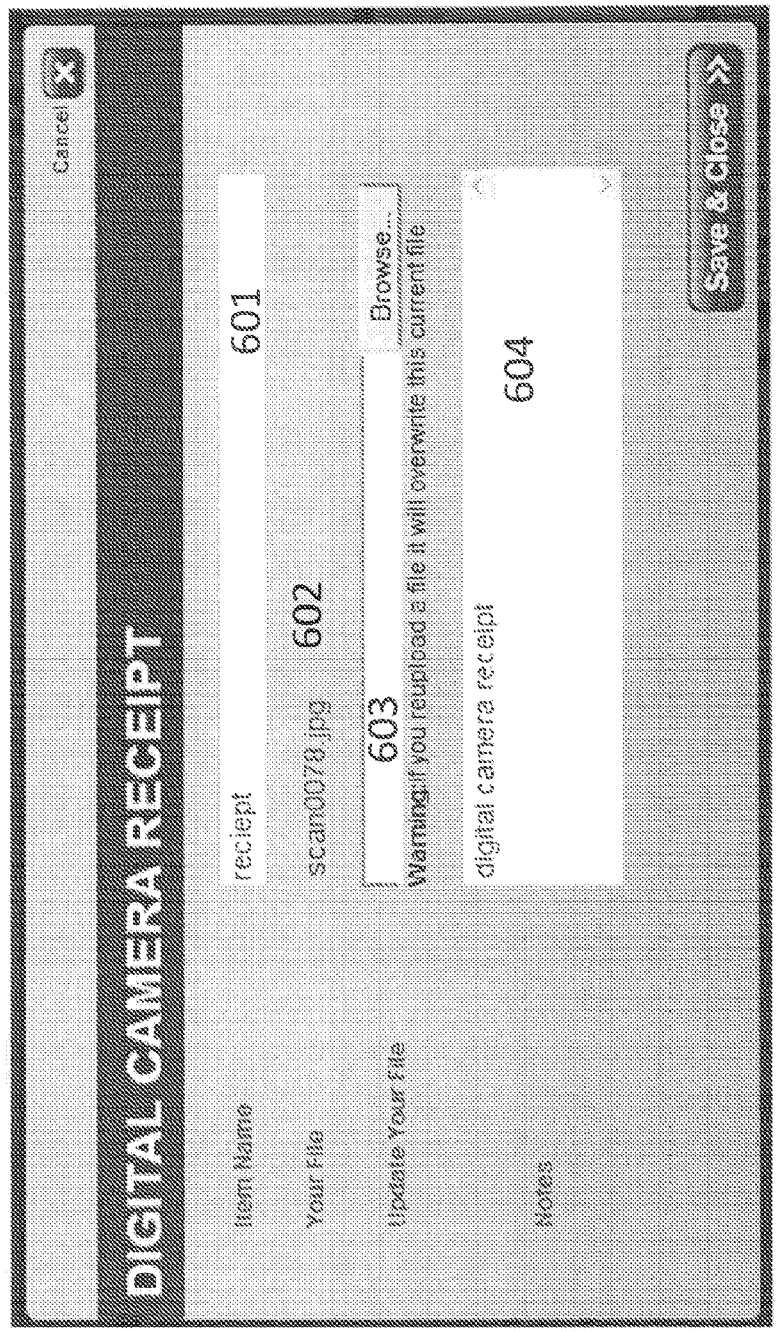
FIG. 6A is another exemplary embodiment of a GUI used to navigate through an online safety deposit box.
Figure 6B:
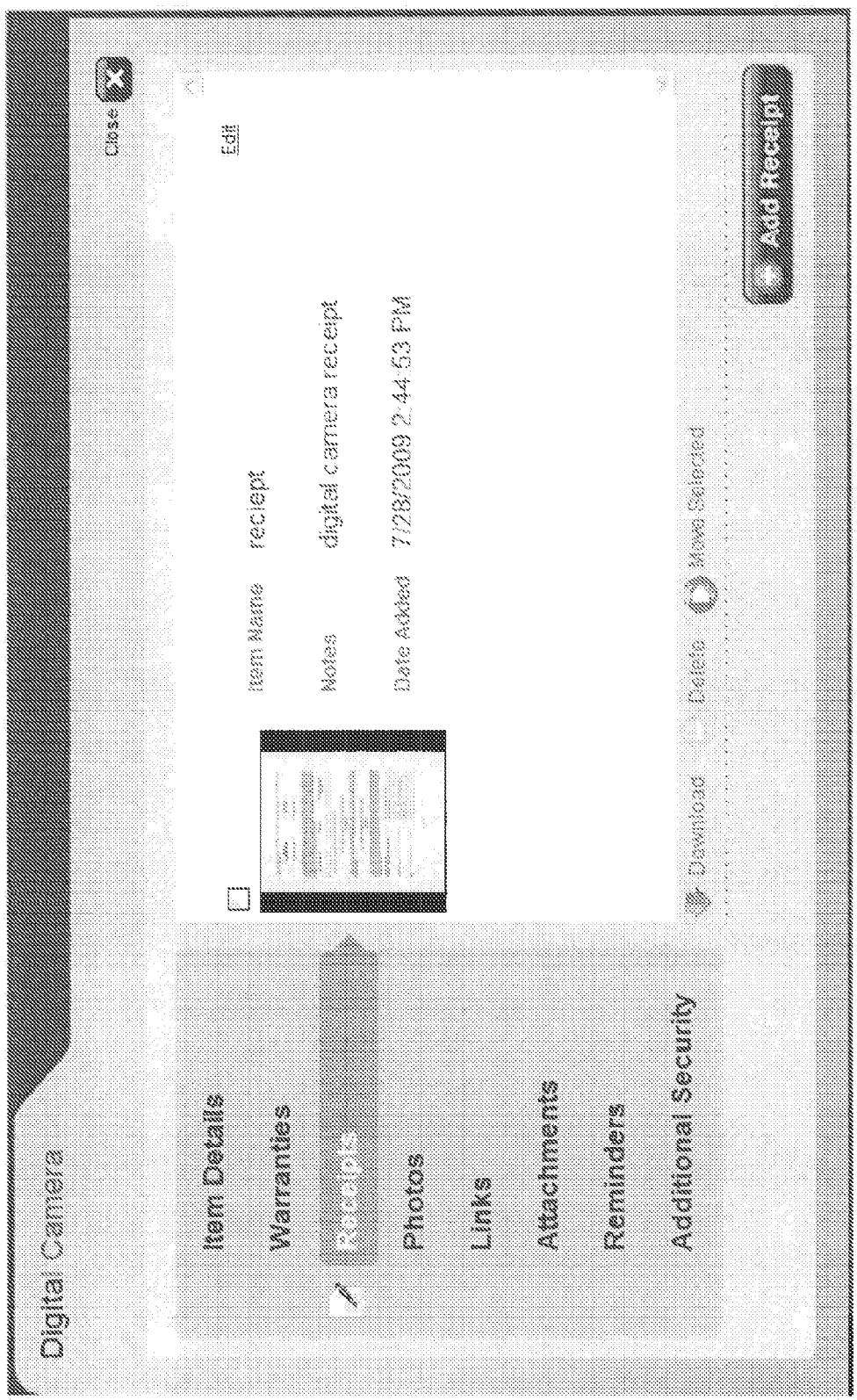
FIG. 6B is another exemplary embodiment of a GUI used to navigate through an online safety deposit box.

After the receipt is uploaded via the GUI of FIG. 6A, the receipt tab, when selected from FIG. 4, may be displayed as shown in FIG. 6B. FIG. 6B provides a display of the metadata provided by the user regarding the receipt for the digital camera. A thumbnail image of the receipt is displayed, along with other metadata regarding the digital camera asset. In other words, the predefined data structure associated to the electronic record of the asset presents a user with metadata regarding the receipt first so the user can determine what is stored in the online safety deposit box, which allows the user to then determine if an underlying file (i.e., a PDF document of the receipt) needs to be retrieved and opened or read.

The "Photos" tab of FIG. 4 provides the user with a GUI (FIG. 6A) that allows the user to upload an image of the digital camera. This may be useful for insurance purposes. If the camera is lost, stolen, or destroyed, the user can maintain an image of the digital camera to show proof of ownership to his insurance company when submitting a claim. The stored image of the receipt may also useful for insurance purposes.

Figure 7A:
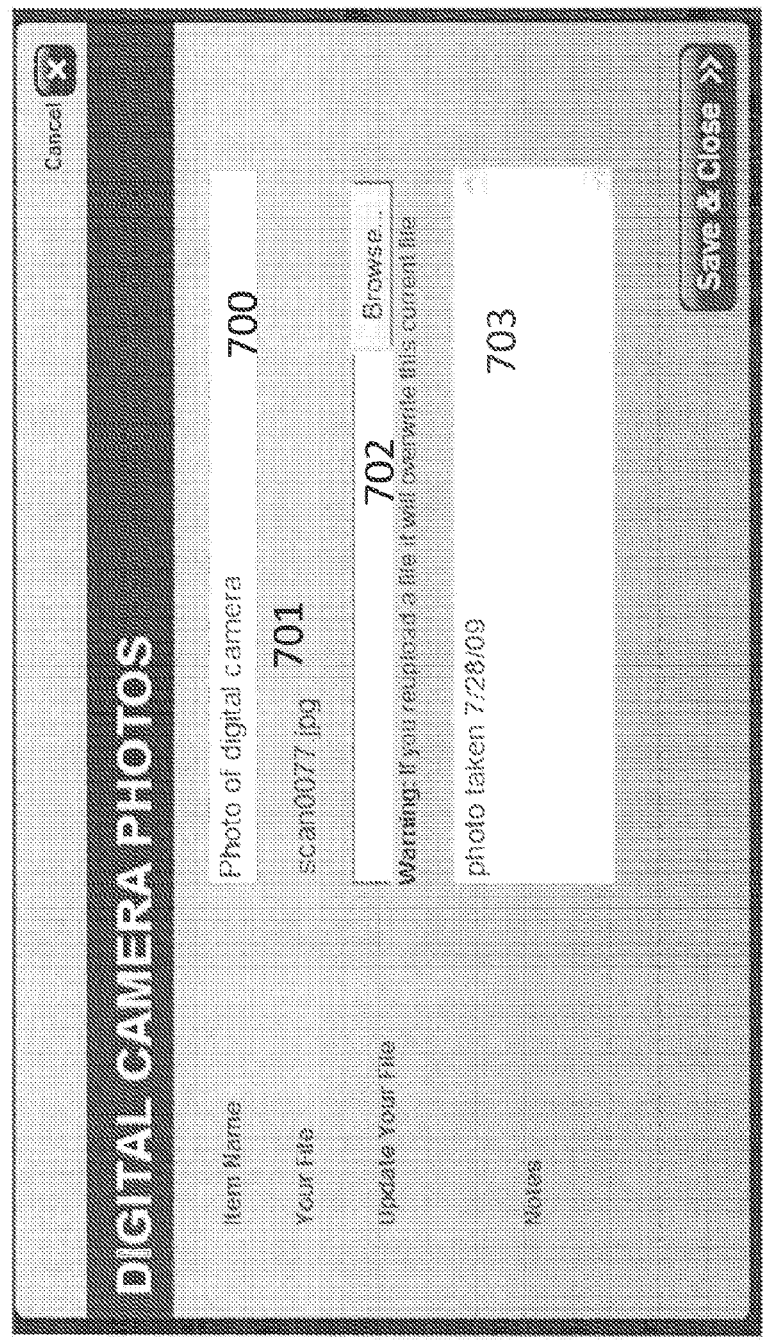
FIG. 7A is another exemplary embodiment of a GUI used to navigate through an online safety deposit box.

The GUI of FIG. 7A includes Item Name field 700, a Your File field 701 identifying the name of the file that was uploaded; an Update Your File field 702 that allows the user to upload a new file, and a Notes field 703 in which the user can provide descriptive comments regarding the uploaded image of the digital camera.

Figure 7B:
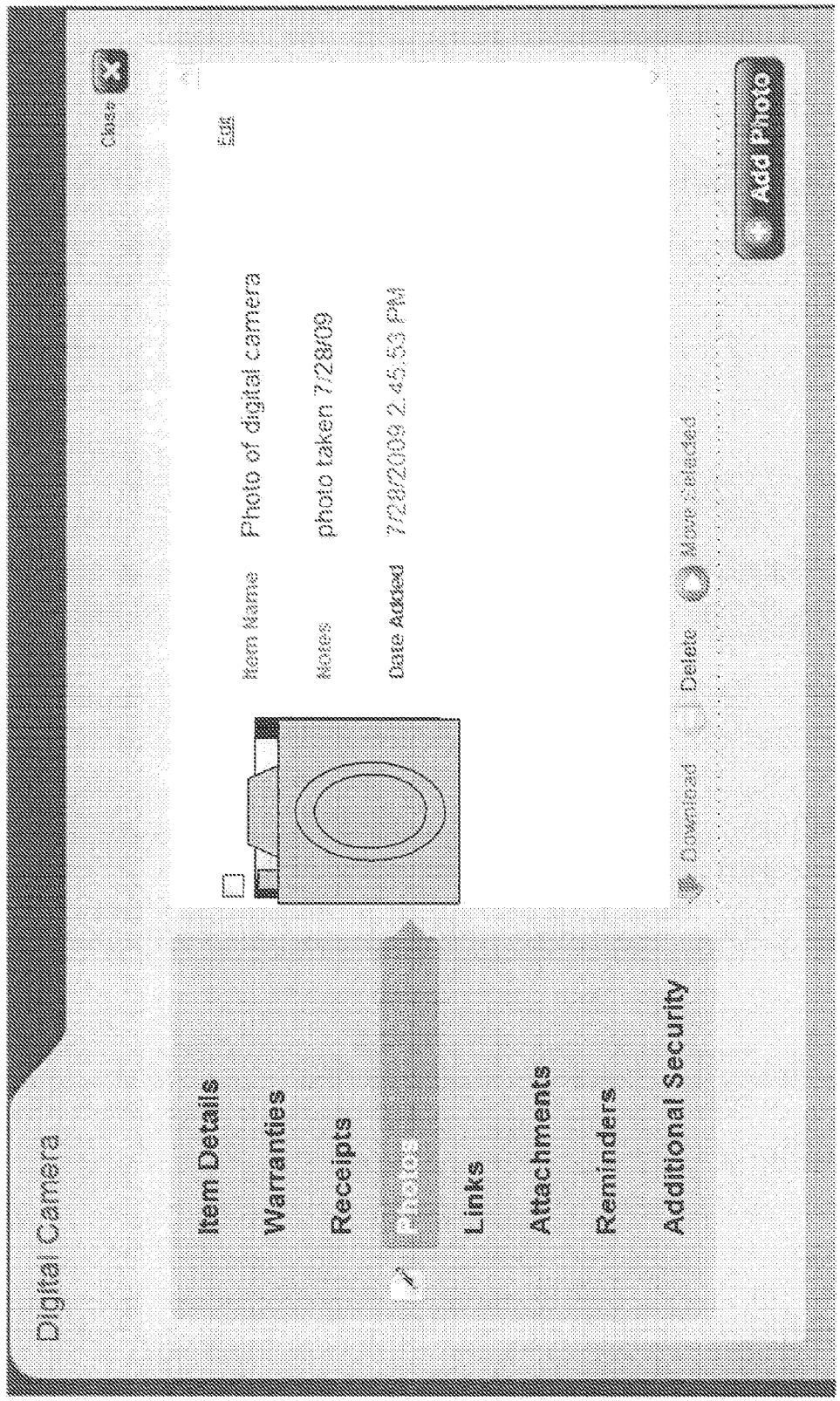
FIG. 7B is another exemplary embodiment of a GUI used to navigate through an online safety deposit box.

After the receipt is uploaded via the GUI of FIG. 7A, the photos tab, when selected from FIG. 4, may be displayed on a screen as shown in FIG. 7B. FIG. 7B shows an exemplary GUI that displays the metadata provided by the user regarding the uploaded image of the digital camera. A thumbnail image of the uploaded image is displayed, along with other metadata regarding the image of the digital camera. The thumbnail image is generated by system computer 12 based on the uploaded image.

The "Link" tab of FIG. 4 provides the user with a GUI (FIG. 8A) that allows the user to associate a web page with the asset (i.e., digital camera). The GUI of FIG. 8A includes an Item Name field 801, a Notes field 802, and URL field 803. The URL entered by the user may be any web page the user wants to store in association with the asset, and may include, for example, the manufacturer's web page, web pages providing reviews of the asset, or web pages providing useful information regarding the user and/or operation of the asset. The notes field in this example includes a reminder that a user's guide is available on the website. However, any text can be entered by the user into field 802.

Figure 8A:
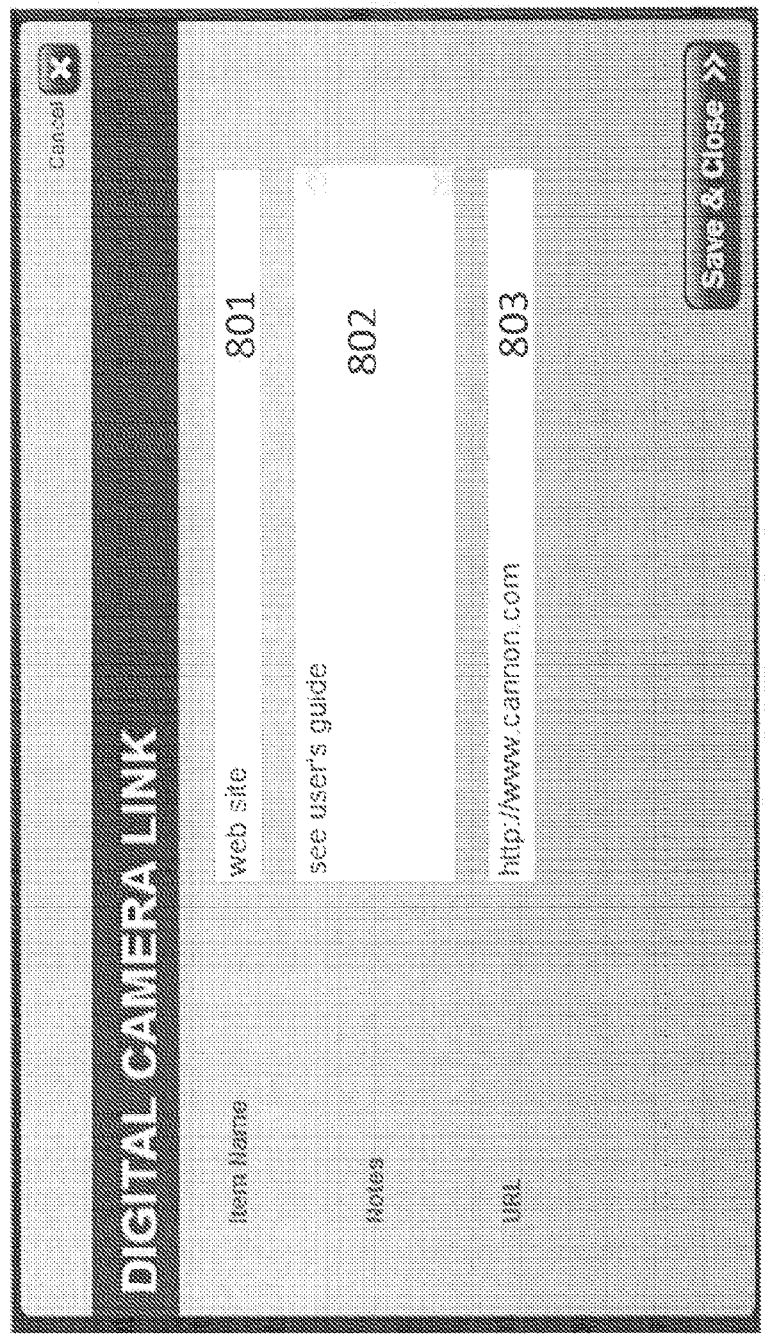
FIG. 8A is another exemplary embodiment of a GUI used to navigate through an online safety deposit box.

After the link is added via the GUI of FIG. 8A, the link tab, when selected from FIG. 4, may be displayed as shown in FIG. 8B. FIG. 8B provides a GUI with the metadata provided by the user regarding the link associated with the digital camera. The URL of FIG. 8B may be an active hyperlink.

The "Attachment" tab allows the user to upload and associate any file with the asset, and provides the user with a GUI similar to FIGS. 6A and 7A, but is more generic in that the uploaded file to attach to the asset (the digital camera) can be anything, and is not limited to a receipt or an image of the asset. A warranty policy may be associated using this interface, and the notes regarding a location of the warranty policy may be added to the warranty information of FIG. 5B.

Figure 9A:
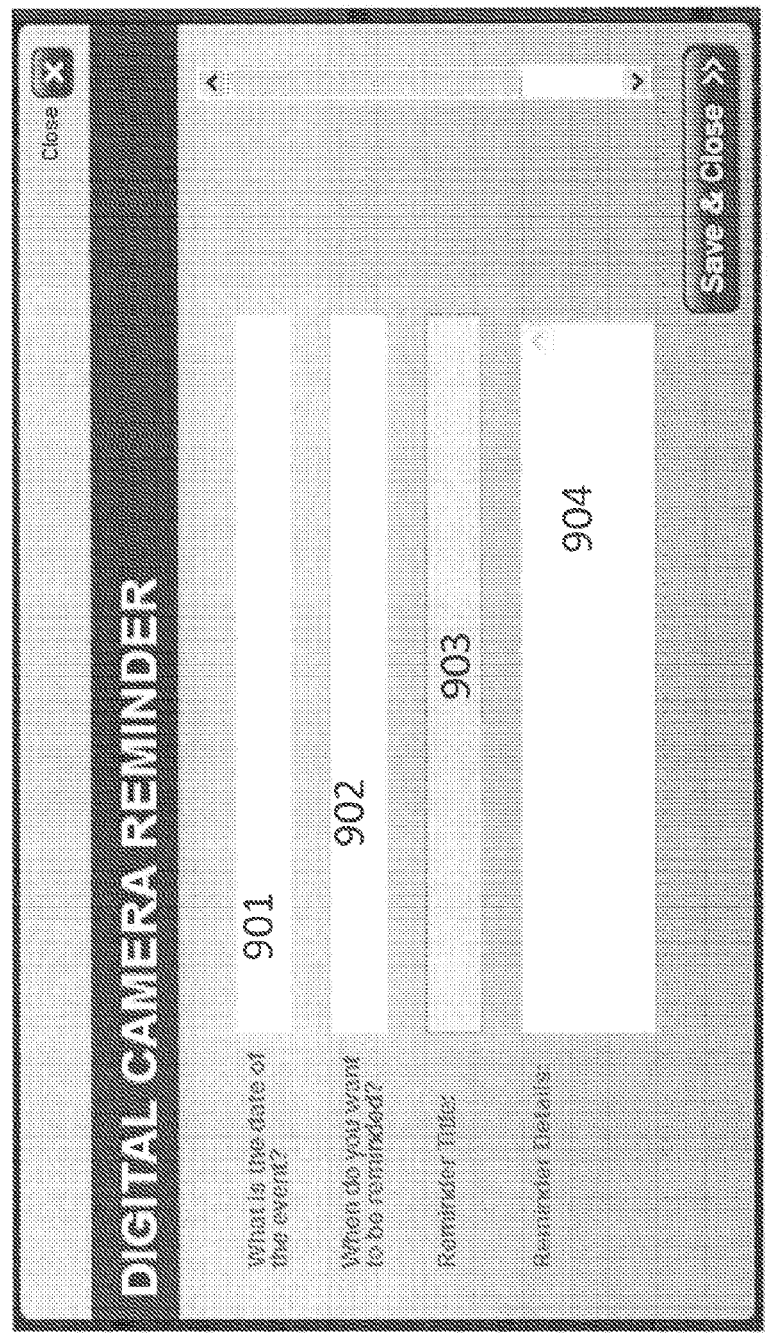
FIG. 9A is another exemplary embodiment of a GUI used to navigate through an online safety deposit box.

The "Reminders" tab in FIG. 4 provides an interface to scheduling module that allows the user to set reminders regarding the asset. When the reminders tab in FIG. 4 is selected, the GUI of FIG. 9A is provided to the user. The GUI of FIG. 9A includes "What is the date of the event" data field 901 in which the user enters the date of the event that triggers the reminder (i.e., expiration of warranty), "When do you want to be reminded" data filed 902 in which the user enters a date of when the reminder should issue, "Reminder title" data field 903 in which the user enters a name/identifier for the reminder, and "Reminder Details" field 904 in which the user adds comments regarding the reminder. In the example of a reminder for a warranty expiration, the comments field may include a reminder to examine the digital camera for problems that may be covered under the warranty.

In one exemplary embodiment, the reminder is sent via email. In another exemplary embodiment, the user selects whether the reminder is sent via email, text message, or both. In addition, a welcome page that is displayed after the user logs into the system may include a window in which all outstanding reminders are displayed.

Figure 9B:
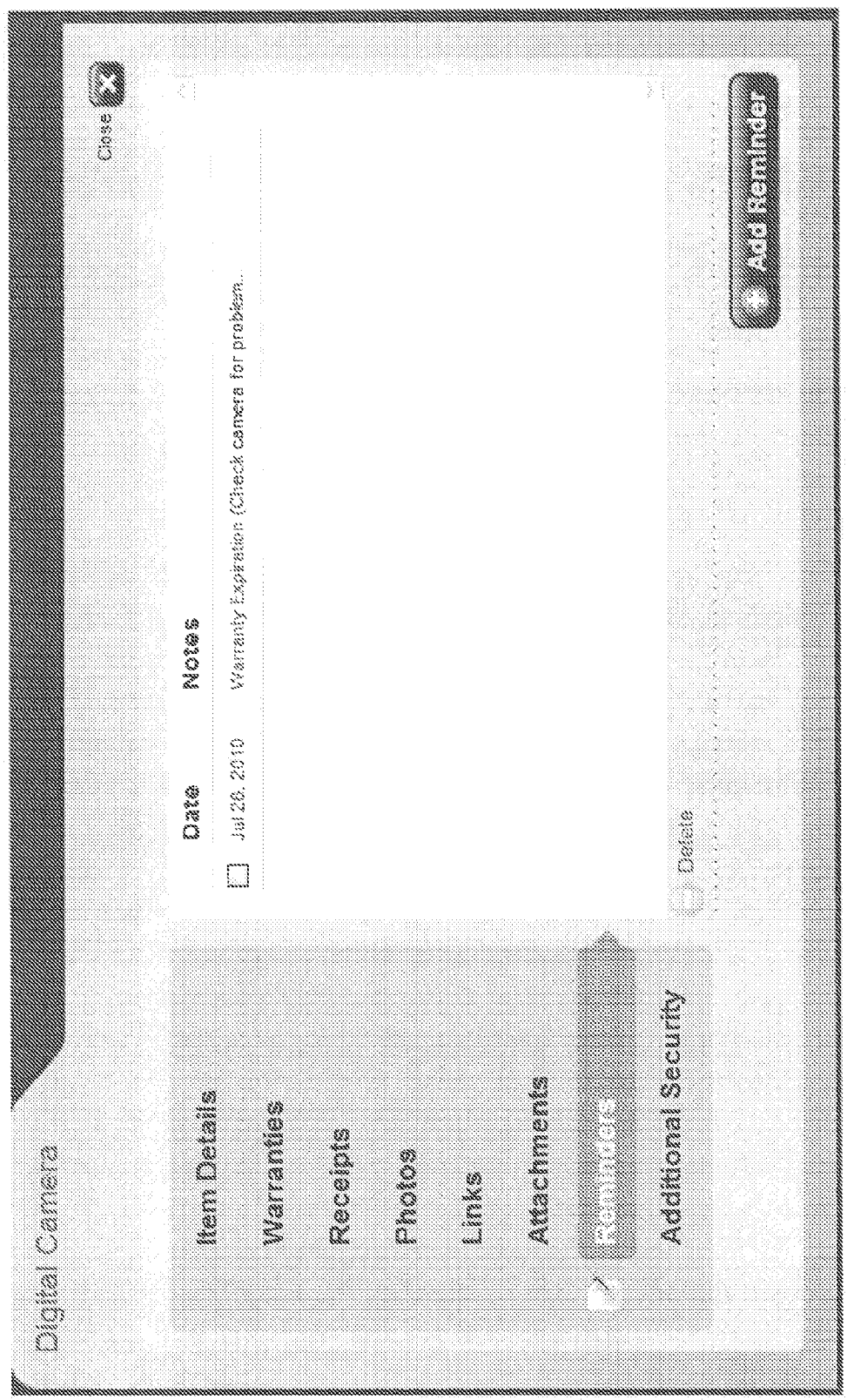
FIG. 9B is another exemplary embodiment of a GUI used to navigate through an online safety deposit box.

After the reminder is added via the GUI of FIG. 9A, the reminders tab, when selected from FIG. 4, may be displayed as shown in FIG. 9B. FIG. 9B provides a GUI with the metadata provided by the user regarding the scheduled reminder.

The "Additional Security" tab of the GUI of FIG. 4 allows the user to control access to the assets. In an exemplary embodiment, multiple people may have some form of access to the initial user's online safety deposit box. The user can control which assets the additional people can access. The additional people may have full access. Alternatively, the additional people may have only limited access. In one embodiment, the user creates assets pertaining to legal documents (i.e., wills, contracts, business formation documents, etc). Then, the user may grant limited access to these documents to his lawyer so the lawyer can obtain the document through the online safety deposit box or upload new documents to the online safety deposit box.

In addition to adding assets to the online safety deposit box pertaining to property, the user may create assets pertaining to his life. These assets are managed separately from the property assets, which includes a separate GUI for creating life assets.

Figure 10:
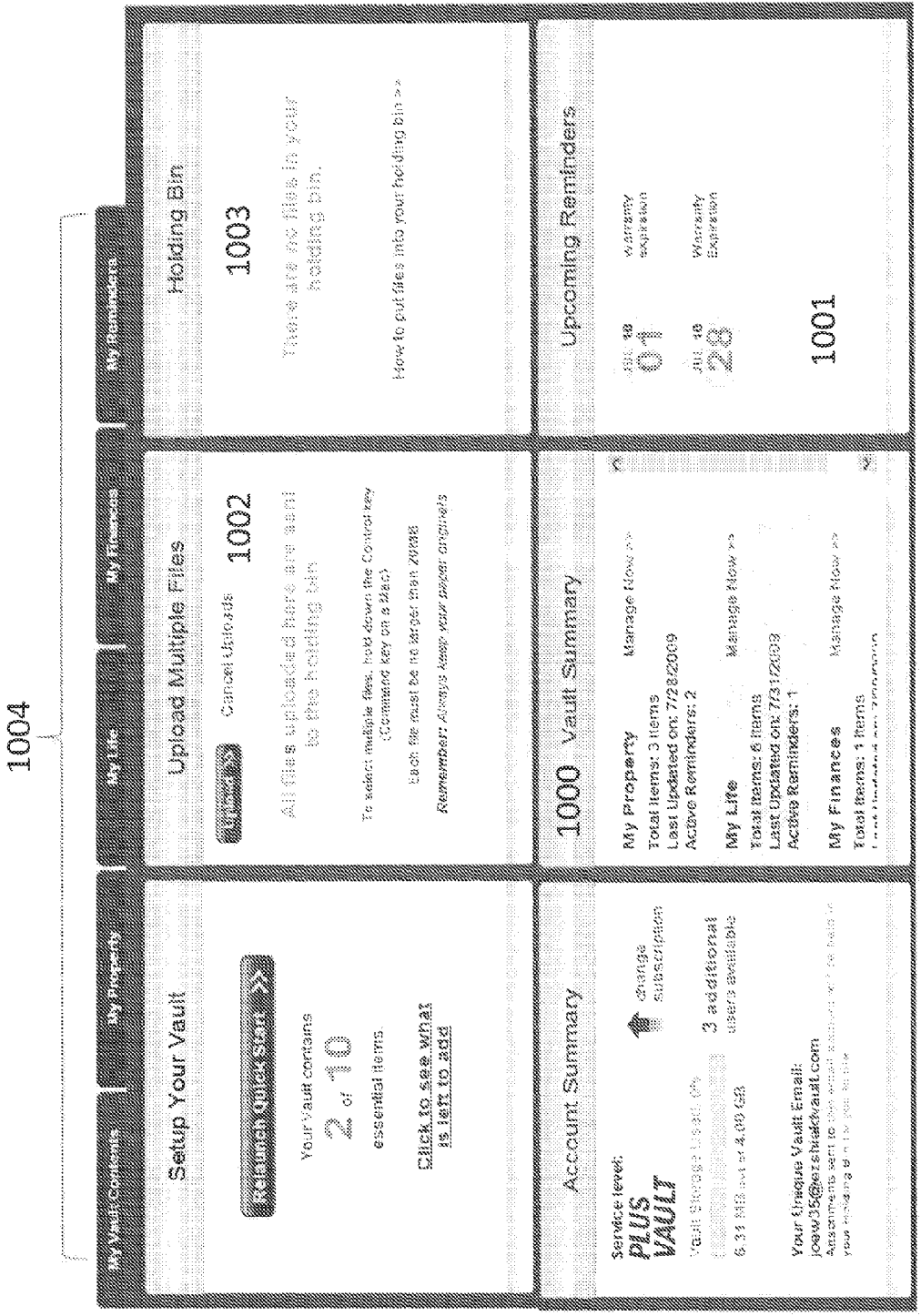
FIG. 10 is another exemplary embodiment of a GUI used to navigate through an online safety deposit box.

FIG. 10 shows an exemplary GUI that is initially displayed when the user logs onto the system. There is a "vault summary" section 1000 in which the assets in the online safety deposit box are summarized. Section 1000 includes active "manage now" buttons that allow to be taken a GUI that manages the assets of the respective categories ("my property," "my life," or "my finances"). There is an "upcoming reminders" section 1001 in which the scheduled reminders for all assets are listed. The reminders listed in section 1001 may be active links, which when selected, provide a GUI to manage the scheduled reminders (see FIG. 12). There is a "upload" section 1002 in which activates a GUI to upload files into the online safety deposit box.

Section 1003 shows a holding bin where visual representations of files that have been loaded into the online safety deposit box but not associated with the predefined data structure (i.e., not associated with an electronic record of an asset). These files may be uploaded to system computer 12 from computer 10 (see FIG. 1), or may be transmitted to system computer 12 via email from any computer (including cell phones or PDAs).

The top of FIG. 10 includes category tabs 1004 for "My Vault Contents," "My Property," "My Life," "My Finances," and "My Reminders."

Figure 11:
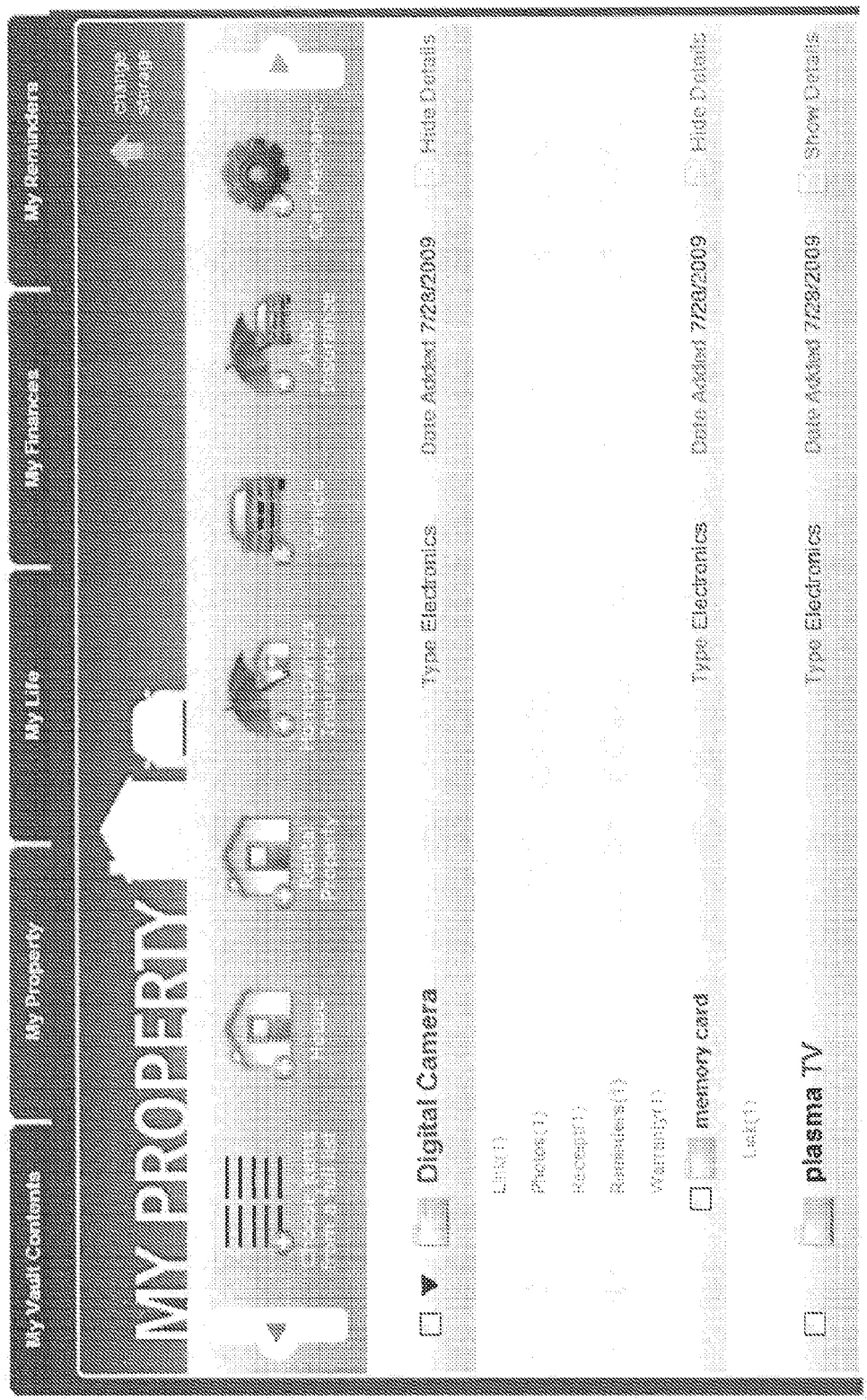
FIG. 11 is another exemplary embodiment of a GUI used to navigate through an online safety deposit box.

FIG. 11 shows an exemplary GUI that is displayed when a user selects the "My Property" tab of FIG. 10. The GUI of FIG. 10 shows three assets; a digital camera, flash memory, and a plasma TV. The flash memory is not at the top level (see FIG. 3 supra), but is a sublevel of the digital camera. Beneath these assets are lists of other items connected with the respective assets. For example, the GUI of FIG. 11 shows that the digital camera has a warranty associated with it, a link associated with it, a photo associated with it, and a reminder associated with it. The number in parenthesis indicates the number of warranties, for example. The detailed list beneath the assets can be hidden by selecting the "hide details" button.

In addition, the items of the online safety deposit box may be sorted and/or grouped by the categories of the metadata (i.e., by the links, photos, receipts, and warranties). For example, all the receipts can be grouped together and displayed in a GUI so the user may view all the receipts in the online safety deposit box. Furthermore, an additional entity may be provided with access to the receipts. For example, access to the receipts may be provided to an accountant so the accountant can access the receipts for tax purposes. In another embodiment, a file or files including the predefined data structure populated with metadata and associated files regarding the receipts can be electronically transferred to another computer via the a network. Of course, this type of limited access can be provided for any item, and not just receipts.

The GUI of FIG. 11 advantageously provides user with an easily accessible record of the assets added to the online safety deposit box. When the user selects the "Digital Camera" in FIG. 11, the GUI of FIG. 4 is displayed and the user can view the warranty information, links, photos, etc. of the digital camera. In another embodiment, the "warranty," "link", etc. underneath the digital camera and plasma TV are active hyperlinks that can navigate to the GUI of FIG. 4.

FIG. 12 shows an exemplary graphical user interface for managing reminders. The reminders are grouped by category (i.e., by "My Property," "My Life," "My Finance," and "My General"). This grouping is exemplary, and the reminders may be grouped in other ways (such as chronological or alphabetical). The GUI of FIG. 12 shows the item name of the asset associated with the, the item type of the asset associated with the reminder, the event date that is the subject of the reminder, the date that identifies when the reminder will be sent (by email or text message, for example), and notes describing the substantive content of the reminder. The GUI of FIG. 12 is displayed when the user selects the "My Reminder" tab of the GUI in FIG. 10, for example. The reminders may be selected from the GUI of FIG. 12 and edited, modified, or deleted. Additional reminders may also be added from the GUI of FIG. 12, or from the GUI of FIG. 4 ("Reminders" tab).

FIG. 13 shows an exemplary embodiment of a method of storing data in a memory device of a computer system. The method of FIG. 13 includes a step 1301 of creating, at the computer system 12, an electronic record of an asset that is stored in the memory device. A non-limiting example of creating an electronic record is accomplished via the GUI of FIG. 3, and the hardware of FIG. 2.

The method of FIG. 13 also includes step 1303 of automatically associating, at the computer system, a predefined data structure with the electronic record of the asset that controls organization and display of metadata describing the asset, the predefined data structure providing data fields for the metadata that are associated with the electronic record of the asset. The predefined data structure is discussed supra, and includes, for example, levels defined for item details, warranties, receipts, photos, links, attachments, reminders, and additional security as shown in FIG. 4, and the data fields associated therewith.

The method of FIG. 13 also includes step 1305 of receiving, at the computer system, the metadata describing the asset from a remote computer. The system computer 12 receives the metadata from the user computers over a network, as shown by the exemplary embodiment of FIG. 1. The metadata is received through the GUI's discussed above and as shown in FIGS. 3-9B. The system computer 12 uses both the GUI's and the hardware of FIG. 2 to receive the metadata. The system computer 12 can communicate using TCP/IP, SNMP, or any other computer protocol.

The method of FIG. 13 also includes step 1307 of populating, at the computer system, the predefined data structure with the metadata describing the asset. As shown by FIG. 5A, the metadata is received from a user through the GUI of FIG. 5A, and the system computer 12 populates data fields in the predefined data structure to generate the GUI of FIG. 5B, which displays a screen of the user supplied metadata regarding the warranty of the digital camera asset.

The method of FIG. 13 also includes step 1309 of generating, at the computer system, a first graphical user interface corresponding to the electronic record of the asset with a plurality of active tabs that provide a visual representation of the predefined data structure associated to the electronic record of the asset, the active tabs, respectively associated with predefined displays including the data fields provided by the predefined data structure, enabling a user to navigate through different displays corresponding to the data fields provided in the predefined data structure associated with the asset to view the metadata describing the asset. FIG. 4 provides an example of a GUI providing a visual representation of the predefined data structure associated to the electronic record of the digital camera asset. Different displays are generated and navigated through by use of the tabs on the left-hand side of FIG. 4, such displays including the data fields exemplary shown by FIGS. 5B, 6B, and 7B that show the user supplied metadata populated into the predefined data structure.

The method of FIG. 13 also includes step 1311 of assigning a respective category to each of a plurality of assets. A category may be assigned to the asset through the GUI of FIG. 3 (item type data field).

The method of FIG. 13 also includes automatically grouping the plurality of assets by their respective category. FIG. 11 shows an example of assets being grouped by the category of "My Property."

The method of FIG. 13 also includes generating a second graphical user interface that displays the assets grouped by their respective categories. FIG. 11 shows an example of a GUI that groups the assets by the category of "My Property."

FIG. 14 shows an exemplary process to log onto system computer 12. The method of FIG. 14 includes step 1401 of receiving a user identifier and password combination and step 1402 of receiving a response to a security question. Of course, additional verification of identify can be applied.

Security of the information stored by system computer 12 may also be enhanced by storing information in an encrypted manner.

Figure 15:
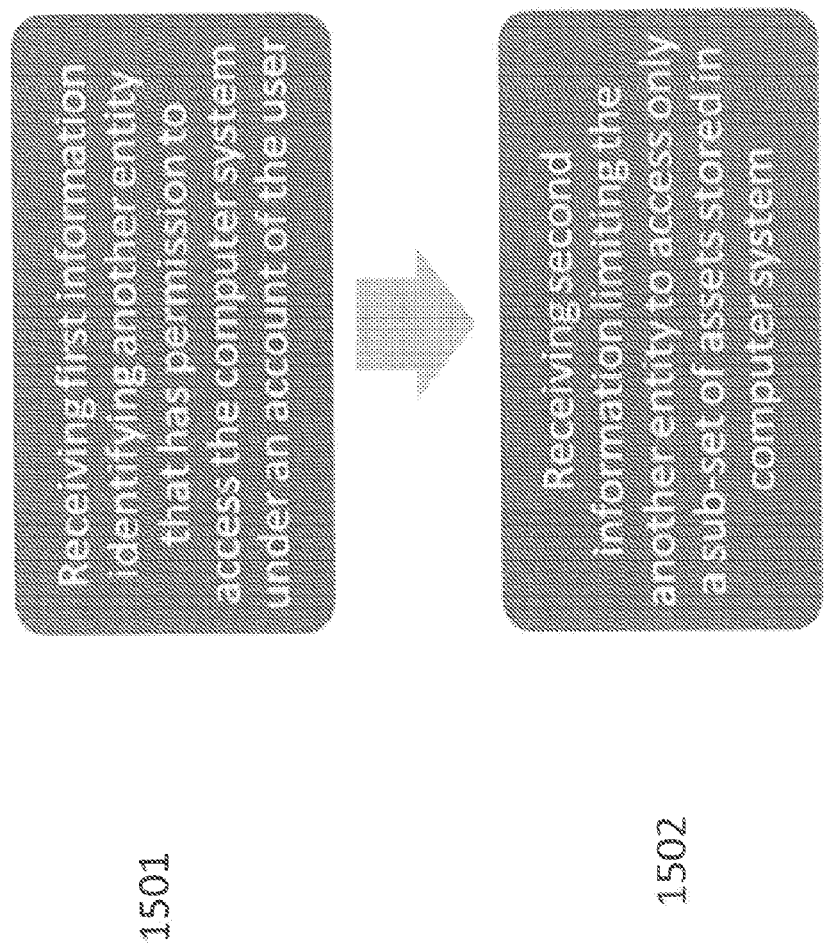
FIG. 15 is an exemplary embodiment of a method of providing additional users access to an online safety deposit box.

FIG. 15 shows a method of providing additional users access to an online safety deposit box of that includes step 1501 of receiving first information identifying another entity that has permission to access the computer system under an account of the user (for example, a login ID and/or a password for the entity); and step 1502 of receiving second information limiting the another entity to access only a sub-set of assets stored in the computer system (i.e., information that identifies particular items within the online safety deposit box that the another entity may access).

FIG. 15 further describes the reception of an image file that is stored in the online safety deposit box. The image file may represent the image file of the receipt in FIGS. 6A and 6B, the photo of FIGS. 7A and 7B, or any attachments provided through the attachment tab of FIG. 4. The method includes step 1501 of receiving an image file. This reception may be through the GUI's of FIG. 6A or 7A, or the image file may be received by system computer 12 through email. An image file may be a JPEG, GIF, bitmap, word file (or other OFFICE data file formats) or PDF file. Step 1503 includes associating the image file with the electronic record of the asset. This includes linking the image file to the electronic record of the asset. Step 1505 includes generating a thumbnail image by the computer system. FIGS. 6B and 7B show examples of a generated thumbnail image, and show examples of step 1507 of displaying the thumbnail image along with the metadata.

Figure 16:
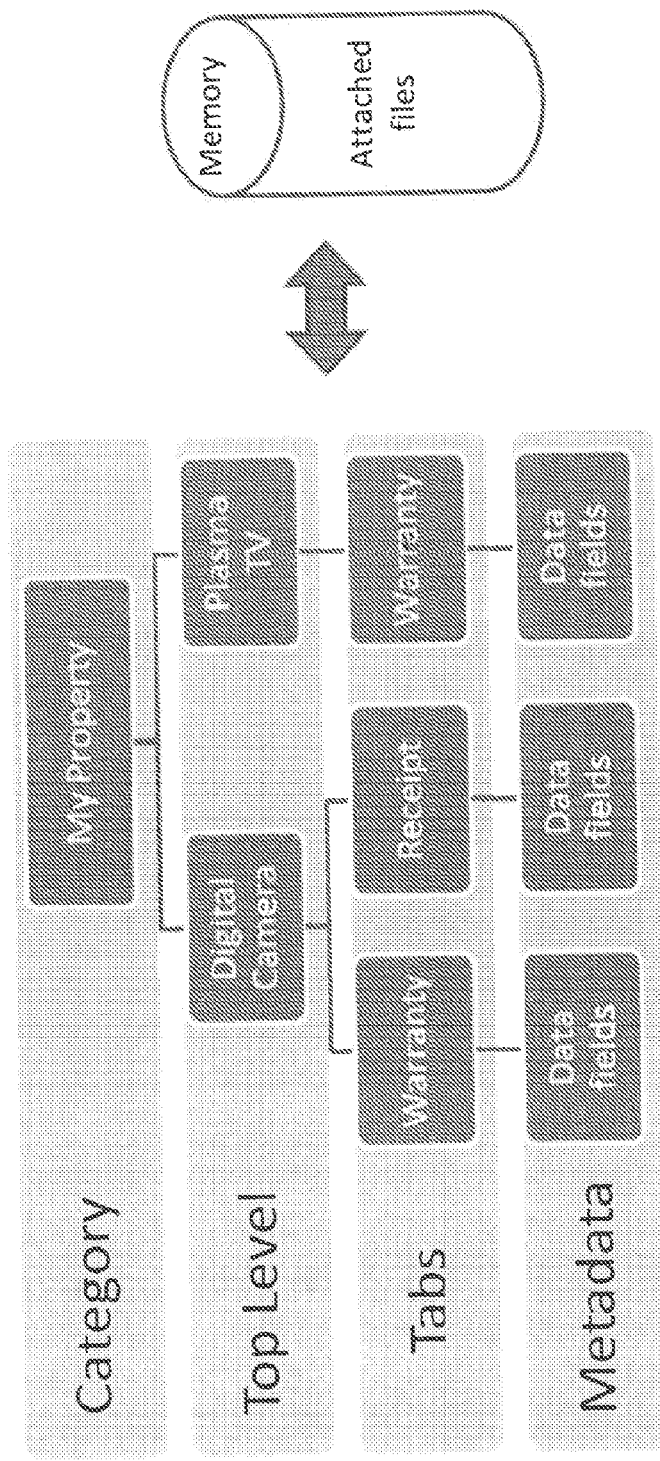
FIG. 16 is table that shows an exemplary layout of a predetermined data structure.

FIG. 16 is a table that shows an exemplary embodiment of the predefined data structure. At the top is the category "my property," which corresponds to tab 1004 in FIG. 10. The top level corresponds to the electronic records of the assets created in FIG. 3. The tabs level corresponds to the tabs 401 in FIG. 4. The metadata level corresponds to the user supplied metadata provided via the GUIs of FIGS. 5A-9B. The arrow in FIG. 16 represents the association between the predefined data structure and any documents that may have been uploaded to the online safety deposit box.

While particular embodiments are described herein, numerous modifications and variations thereof are possible in light of the above teachings. It is therefore to be understood that within the scope of the appended claims, the invention may be practiced otherwise than as specifically described herein.

The invention claimed is:

1. A method of storing data in a memory device of a computer system, comprising:

creating, at the computer system, an electronic record of an asset that is stored in the memory device;

automatically associating, at the computer system, a predefined data structure with the electronic record of the asset that controls organization and display of user provided metadata describing the asset, the predefined data structure providing data fields for the user provided metadata that are associated with the electronic record of the asset;

receiving, at the computer system, the metadata describing the asset from a remote computer;

populating, at the computer system, the predefined data structure with the metadata describing the asset;

generating, at the computer system, a first graphical user interface corresponding to the electronic record of the asset with a plurality of active tabs that provide a visual representation of the predefined data structure associated to the electronic record of the asset, the active tabs, respectively associated with predefined displays including the data fields provided by the predefined data structure, enabling a user to navigate through different displays corresponding to the data fields provided in the predefined data structure associated with the asset to view the metadata describing the asset without having to open the file itself;

assigning a respective category to each of a plurality of assets and automatically grouping the plurality of assets by their respective category and generating a second graphical user interface that displays the assets grouped by their respective categories; and performing a log-in process for the computer system that includes receiving a user identifier and password combination, and a response to a security question and storing data at the computer system in an encrypted form.

2. The method of claim 1, further comprising:

receiving first information identifying another entity that has permission to access the computer system under an account of the user; and receiving second information limiting the another entity to access only a sub-set of assets stored in the computer system.

3. The method of claim 2, wherein the receiving includes receiving the image file via an email, and the method further comprising:

storing the image file received via the email in a holding area until an instruction is received regarding how the image file is associated with the predefined data structure.

4. The method of claim 1, further comprising:

receiving an image file;

associating the image file with the electronic record of the asset;

generating a thumbnail image by the computer system; and displaying the thumbnail image along with the metadata.

5. A non-transitory computer readable storage medium encoded with instructions, which when executed by a computer system causes the computer system to implement a method comprising:

creating, at the computer system, an electronic record of an asset that is stored in a memory device of the computer system;

automatically associating, at the computer system, a predefined data structure with the electronic record of the asset that controls organization and display of user provided metadata describing the asset, the predefined data structure providing data fields for the user provided metadata that are associated with the electronic record of the asset;

receiving, at the computer system, the metadata describing the asset from a remote computer;

populating, at the computer system, the predefined data structure with the metadata describing the asset; and generating, at the computer system, a first graphical user interface corresponding to the electronic record of the asset with a plurality of active tabs that provide a visual representation of the predefined data structure associated to the electronic record of the asset, the active tabs, respectively associated with predefined displays including the data fields provided by the predefined data structure, enabling a user to navigate through different displays corresponding to the data fields provided in the predefined data structure associated with the asset to view the metadata describing the asset without having to open the file itself;

assigning a respective category to each of a plurality of assets and automatically grouping the plurality of assets by their respective category and generating a second graphical user interface that displays the assets grouped by their respective categories; and performing a log-in process for the computer system that includes receiving a user identifier and password combination, and a response to a security question and storing data at the computer system in an encrypted form.

6. The non-transitory computer readable storage medium of claim 5, wherein the method further comprises:

receiving first information identifying another entity that has permission to access the computer system under an account of the user; and receiving second information limiting the another entity to access only a sub-set of assets stored in the computer system.

7. The non-transitory computer readable storage medium of claim 6, wherein the receiving includes receiving the image file via an email; and the method further comprises storing the image file received via the email in a holding area until an instruction is received regarding how the image file is associated with the predefined data structure.

8. The non-transitory computer readable storage medium of claim 5, wherein the method further comprises:

receiving an image file;

associating the image file with the electronic record of the asset;

generating a thumbnail image by the computer system; and displaying the thumbnail image along with the metadata.

9. An apparatus comprising:

a memory device configured to store user provided data and executable instructions;

a processor configured to execute the instructions; and bus configured to interconnect the memory device and the processor, wherein the processor is configured to:

create an electronic record of an asset that is stored in the memory device, and automatically associate a predefined data structure with the electronic record of the asset that controls organization and display of user provided metadata describing the asset, the predefined data structure providing data fields for the user provided metadata that are associated with the electronic record of the asset;

a communication device configured to receive the metadata describing the asset from a remote computer, wherein the processor is further configured to populate the predefined data structure with the metadata describing the asset, and to generate a first graphical user interface corresponding to the electronic record of the asset with a plurality of active tabs that provide a visual representation of the predefined data structure associated to the electronic record of the asset, the active tabs, respectively associated with predefined displays including the data fields provided by the predefined data structure, to enable a user to navigate through different displays corresponding to the data fields provided in the predefined data structure associated with the asset to view the metadata describing the asset without having to open the file itself;

assigning a respective category to each of a plurality of assets and automatically grouping the plurality of assets by their respective category and generating a second graphical user interface that displays the assets grouped by their respective categories; and performing a log-in process for the computer system that includes receiving a user identifier and password combination, and a response to a security question and storing data at the computer system in an encrypted form.

10. The apparatus of claim 9, wherein the communication device is further configured to:

receive first information identifying another entity that has permission to access the apparatus under an account of the user, and receive second information limiting the another entity to access only a sub-set of assets stored in the memory device.

11. The apparatus of claim 10, wherein the communication device is configured to receive the image file via an email, and the memory device is configured to store the image file received via the email in a holding area until an instruction is received regarding how the image file is associated with the predefined data structure.

12. The apparatus of claim 9, wherein the communication device is further configured to receive an image file; and the processor is further configured to:

associate the image file with the electronic record of the asset;

generate a thumbnail image by the computer system; and cause the thumbnail image to be displayed along with the metadata.

* * * * *